May 28, 1968          E. W. MIX          3,385,952
LUNCH KIT FOR CARRYING AND HEATING FROZEN-FOOD TRAYS
Filed July 19, 1965          2 Sheets-Sheet 1
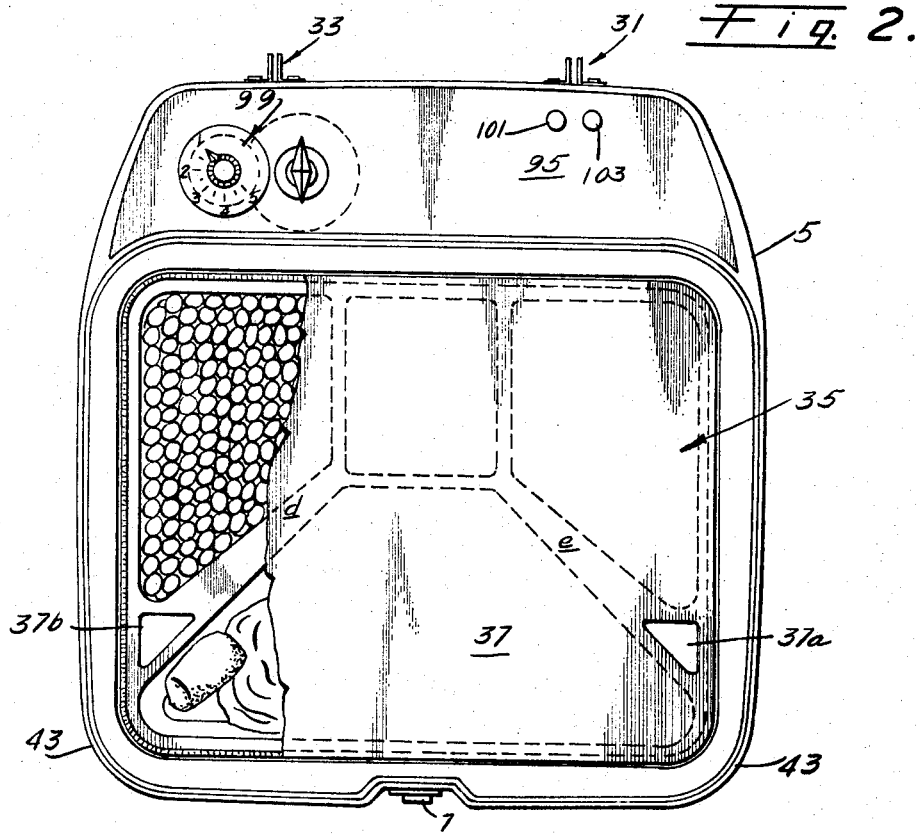
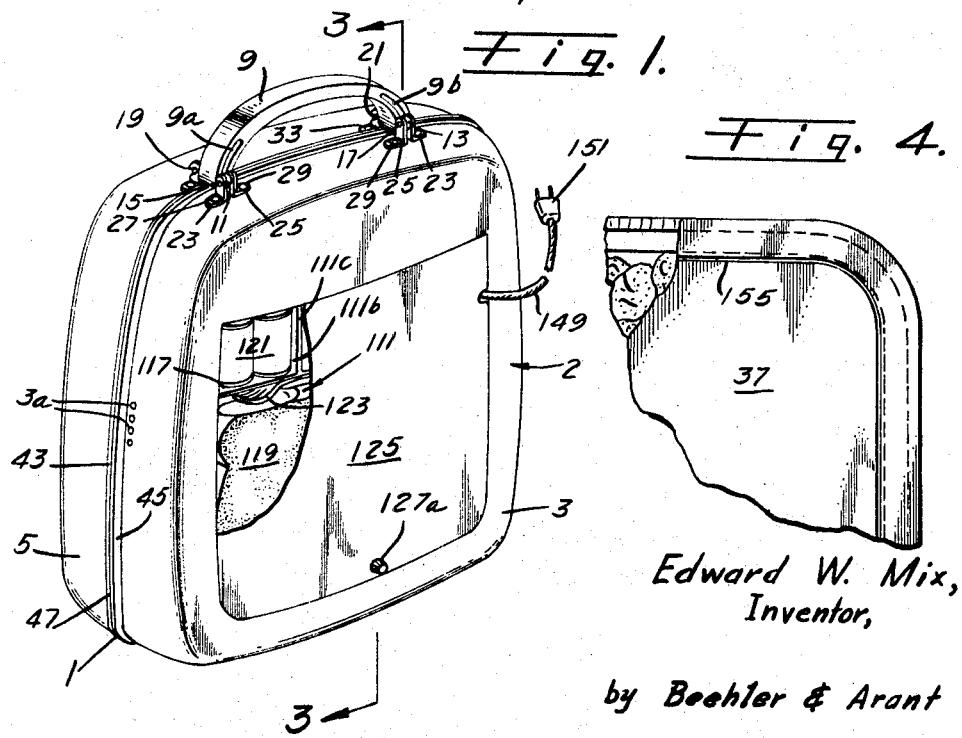
Edward W. Mix,
Inventor,
by Beehler & Arant
Attorneys May 28, 1968      E. W. MIX      3,385,952
LUNCH KIT FOR CARRYING AND HEATING FROZEN-FOOD TRAYS
Filed July 19, 1965      2 Sheets-Sheet 2
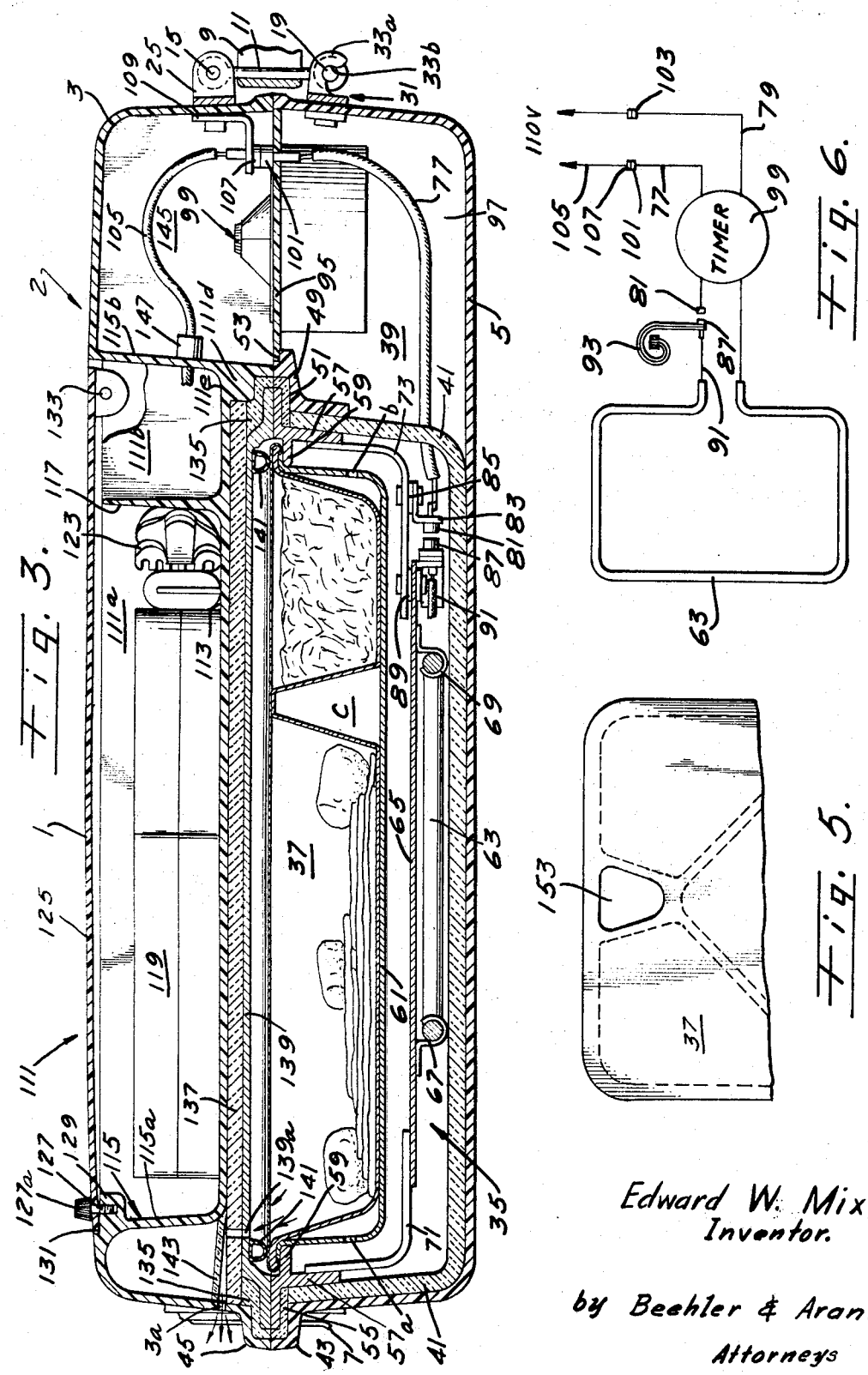
Edward W. Mix,
Inventor.
by Beehler & Arant
Attorneys

United States Patent Office 3,385,952
Patented May 28, 1968

3,385,952
LUNCH KIT FOR CARRYING AND HEATING
FROZEN-FOOD TRAYS
Edward W. Mix, 13929 Elmbrook Drive,
La Mirada, Calif. 90638
Filed July 19, 1965, Ser. No. 472,911
6 Claims. (Cl. 219—387)

This invention relates to portable lunch-kit means for furnishing hot food in locations where cooking or heating facilities are, for one reason or another, either unavailable, or impracticable for use. More particularly, the invention relates to such means especially adapted to automatically defrost and heat frozen food of the type packaged in a tray- or dish-like container, and thereafter permit eating the heated food directly from the container.

It is common knowledge that many working people, such as office workers, construction workers, professionals, etc., are forced by circumstances to carry cold lunches for consumption at worksites devoid of facilities for the preparation of hot food, or other places equally lacking in such facilities. For this reason, plus the fact that even if conventional cooking or heating means were available, many workers would be unable to use them because of the time loss and inconvenience thereby involved, a large percentage of those who work for their daily bread are forced to eat it cold, figuratively speaking, when on the job. This is true even though it is common knowledge that hot means are more nourishing, and far more enjoyable, than cold ones.

It is well known that frozen foods in all stages of preparation, from raw to completely cooked, have become increasingly popular in recent years. Many of these frozen foods are available in tray- or dish-like containers, made of thin gauge aluminum and having peripheral flanges around their top edges, with aluminum foil covering the food, the foil being folded over the outer edges of said peripheral flanges and crimped thereunder. Such a container commonly provides a balanced meal packaged in frozen form in a compartmented tray with its separate parts, such as, for example, servings of meat or other entree, potatoes, green vegetables, etc., segregated in the compartments of the tray. Frozen meals of this type, and others of similar character, are available in a variety of food combinations and they are normally defrosted and prepared for heating by heat treatment in an ordinary kitchen oven for a predetermined period of time and at a temperature normally within the range from about 425° to about 450° F. The hot food is generally eaten directly from the hot tray after removal of its aluminum foil cover, either by uncrimping the cover from the tray flange and lifting it away from the food or by puncturing the foil and then tearing it as necessary to accomplish the same purpose.

While a hot packaged meal, or its equivalent, would be a welcome substitute for a cold lunch, no one has, to my knowledge, found a practical way of making such a substitution possible because of the necessity of defrosting and heating frozen food before it is fit for eating. I have now discovered a way of accomplishing the foregoing objective through a utilization of a compact carrying case, with built-in heating means, adapted to receive and hold a package of frozen food, such as a packaged meal, or the like, and suitable for hand carrying to a worksite, or elsewhere. The carrying case with heating means functions by defrosting its frozen food contents and heating the thus-defrosted food to proper eating temperature. The carrying case, with heating means, sometimes hereinafter referred to as a lunch kit, is no larger nor more awkward to carry than any conventional lunch box and, in one of its forms, requires no outside source of heat energy to accomplish its food defrosting and heating function. The method of using the lunch kit of this invention is extremely simple, comprising merely the steps of loading the kit with a properly sized and shaped package of frozen food, carrying the loaded kit to the work, school, or other, site where the food is to be eaten, and adjusting a heat control system accessory thereto, later to be described, to automatically turn on the heat at the proper time to prepare the food for heating when desired. The latter, heat-turn-on control feature is not critical to, but only a preferred accessory of, the lunch kit of this invention, as will later be more apparent.

It is thus a principal object of the present invention to furnish easily carried lunch kit means with built-in capacity for providing hot food in the absence of conventional kitchen facilities.

It is another object of the invention to furnish such means adapted to convert commercially available packages of frozen food to heated form for on-the-spot consumption.

It is still another object of the invention to provide such means adaptable for carrying and heating packaged frozen food, so characterized as to permit the heated food to be eaten directly from its hot container without the necessity of having to handle the container.

It is yet another object of my invention to provide a unique frozen food package amenable to heat treatment to prepare the food for eating and having a metal foil top covering so characterized as to permit its ready removal to uncover the food in the package, after it has been heated, by contact with only the upfacing surface thereof.

Other objects, features and advantages of my invention will become apparent from the following description, taken in conjunction with the accompanying drawings, of which:

FIGURE 1 is a perspective view of a preferred embodiment of the lunch kit of my invention, loaded with food and disposed in normal carrying position, showing a portion of a top cover member broken away to reveal the storage arrangement of certain of the food items in the kit.

FIGURE 2 is an enlarged top view of the bottom portion of the FIGURE 1 lunch kit loaded with a metal foil covered tray of food, the foil being partially broken away to reveal the food covered thereby and the tray being designed in accordance with the teachings herein.

FIGURE 3 is a still further enlarged sectional view of the lunch kit, taken along line 3—3 of FIGURE 1 but with the kit rotated 90° from its carrying positon as shown in FIGURE 1, and with its carrying handle partially broken away.

FIGURE 4 is an enlarged top view of a fragmentary section of a metal foil covered food tray similar to that shown in FIGURE 2 but having a tear line closely paralleling, and slightly inboard of, the peripheral flange of the food tray, the flat portion of the underlying flange being shown in dotted outline and a part of the covering foil being broken away to reveal the top appearance of the flange and a sampling of the food contents of the tray.

FIGURE 5 is a fragmentary plan view of a metal foil covered food tray embodiment of this invention of a different design from the FIGURE 2 food tray.

FIGURE 6 is a circuit diagram of an electrical control system for automatically timing and controlling the thawing and heating of frozen food in the pictured lunch kit.

Turning now to detailed consideration of the drawings, and particularly FIGURES 1, 2 and 3, there is shown an enclosing case 1, consisting of two parts of substantially equivalent size, 3 and 5, which fit together around their opening rims to form an upper and lower half, respectively, of the case, when it is closed and in its normal position of use, as depicted in FIGURE 3. Upper and lower halves 3 and 5, respectively, of case 1 are not actual halves thereof—nor is this terminology consistent with symmetrical division of the whole lunch kit (hereinafter designated lunch kit 2) into halves—but they are sufficiently close in size to warrant the employment of such terminology.

Upper and lower halves 3 and 5 of case 1 are internally compartmented, as described below, and they are equipped with accessory hinge and fastening means, also as described below, whereby they can be tightly sealed together, when such closure is required for lunch carrying and storing purposes, and easily unlocked and swung apart, as well as completely disassembled, when it is desired to open the case for access to its food contents, or for any other reason. The halves of the case are, as the drawings illustrate, of molded plastic construction with flat peripheral edges so designed as to meet flush all around when the case is in the closed position shown in FIGURE 3.

The aforesaid fastening means for the two halves of case 1 is shown at 7 on FIGURES 2 and 3, and will be hereinafter referred to as clasp 7. Clasp 7 is a conventional clamping device of the type commonly used to fasten carrying cases of various sorts, such as, for example, suitcases, attaché cases, typewriter cases, etc., together. Clasp 7 is on the front side of case 1. On the rear side of the case there is a handle 9 which will later be described in detail. As FIGURE 3 illustrates particularly well, the meeting peripheral edges of the two halves of case 1 are the terminal boundaries of lip-like protrusions from their respective side walls which extend completely therearound, the degree of protrusion, in each instance, varying around the perimeter of the case and being far greater at the front, in the vicinity of clasp 7, than at the rear, in the vicinity of carrying handle 9. These lip-like protrusions form a bead-like ridge around the middle of the case when its two halves are fastened together, the ridge, of course, varying in prominence with the degree of outward protrusion of the meeting edges of said halves.

The bead-like ridge is interrupted in the middle of its span along the front of the closed case to provide an indentation of sufficient width to accommodate clasp 7 in the manner illustrated in FIGURES 1 and 3. The indentation serves the double purpose of furnishing a substantially flat anchor base for the clasp on the front wall of the case and minimizing the surface disrupting effect of the clasp by providing a sheltering cove for it as shown.

Handle 9 comprises a curved strap member with arcing, elongate slots extending transversely through each end, as shown at 9a and 9b (and hereinafter designated handle slots 9a and 9b, respectively) on FIGURE 1. Handle slots 9a and 9b receive anchoring crosspins 11 and 13, respectively, themselves anchored as hereinafter described, to hold it in place on the rear side of case 1 in its closed position of storage as shown in FIGURE 3, or on the upper side of the case in its normal carrying position, as shown in FIGURE 1. Handle 9, as illustrated, is of metallic construction, but it can, of course, be made of any material suitable for the purpose such as, for example, plastic, leather, wood, or the like. The handle is so sized and configured as to permit its easy and comfortable grasp for purposes of carrying the case.

Crosspins 11 and 13 are each eye-looped at both ends and each of the resulting eye-loops has a short lock pin, of round cross-section, passing transversely therethrough with an end projecting from each face of the eye-loop. The lock pins are shown at 15, 17, 19 and 21 on the drawings, and will hereinafter be designated by those numbers. The four lock pins are of equal size and shape, and each fits tightly within the crosspin eye-loop through which it passes. Lock pins 15 and 17 are each terminally secured in two L-shaped metal brackets fastened to upper half 3 of the case by rivet means in the manner illustrated in the drawings. Since the fastening arrangement is similar for each of these lock pins, it will now be described in greater detail with respect to lock pin 15, the mode of fastening of lock pin 17 being thereby made obvious, particularly in view of the drawing illustration of same.

Directing attention now to the illustration of lock pin 15 on the drawings, it will be seen that the two ends of the member are fitted into mating holes therefor near the upper ends of the upstanding legs of two of the abovementioned L-shaped brackets, 23 and 25, respectively. The brackets are so positioned as to closely flank the two opposite faces of the eye-loop in the end of crosspin 11 through which lock pin 15 passes, and to receive the ends of the lock pin to the full depth of their respective thicknesses. The pin-hole fit between each end of lock pin 15 and the opening in the upstanding leg of its cooperating support bracket is tight to help prevent the pin from migrating out of its working position as described here and illustrated in the drawings. The upstanding legs of L-shaped brackets 23 and 25 are parallely disposed and the lock pin receiving opening in each is aligned with that of the other in order to permit proper mating thereof with the ends of lock pin 15. The opposite legs of the two brackets are disposed flush against the wall surface of the upper half of case 1 and so oriented as to extend in opposite directions from each other in the manner depicted by the drawings. Each of the brackets is fastened in place at its proper station on the wall of case 1 by a single rivet passing through a receptive opening therefor in its wall-flush leg, the rivets being shown at 27 and 29 for brackets 23 and 25, respectively.

Lock pins 19 and 21 pass through the eye-loop in the opposite ends of crosspins 11 and 13, respectively, to the eye-looped ends through which lock pins 15 and 17 pass. The physical relationship between these lock pins and end eye loops of crosspins 11 and 13 is similar to that between lock pins 15 and 17 and the eye-loops in the other ends of the crosspins, but the manner of anchoring the lock pins is substantially different in the two cases. The principal reason for this difference is the fact that the fastening hardware for handle 9 is so designed as to rigidly hold the handle in place when case 1 is closed, yet permit complete separation of the two halves of the case when it is opened up. To this end, and since handle 9 must be so located as to permit proper hang and balance of the case during hand carriage thereof, crosspins 11 and 13 extend across the meeting peripheral edges of the two halves of case 1, which means that they are each fastened at one end to the upper half of the case and at the other end to the lower half and that, accordingly, the hardware fastening at least one of the two ends in place must be so designed and assembled as to easily come apart when the case is open, and thereby permit separation of its two halves. Since, as we have seen, the fastening hardware at the lock pin 15 and 17 ends of crosspins 11 and 13, respectively, permits of no such ready disassembly, the latter feature is built into the fastening hardware at the lock pin 19 and 21 ends of the crosspins, thus accounting for the above-noted fastening hardware differences between the two ends of those pins.

Focusing attention now upon the hardware fastening structure at the lock pin 19 and 21 ends of the handle cross-pins, it is first noted that lock pins 19 and 21 are tightly secured, at their mid-sections, within their respectively mating eye-loops on crosspins 11 and 13. Thus, each lock pin projects perpendicularly outwardly from each face of its cooperant eye-loop the same distance that its counterpart pin projects from each face of the eye-loop at the opposite end of the crosspin. In view of the foregoing, and since lock pins 15 and 17 are joined by bracket means to upper half 3 of the pictured case, lock pins 19 and 21 are joined to the lower half of the case. For the reasons set forth above in justifying the limitation of the description of the fastening hardware for lock pins 15 and 17 to that of the former, only the fastening hardware for lock pin 19 will here be described relative to the lock pins 19 and 21 fastening arrangements.

Proceeding now to hardware particulars, lock pin 19 is held in place, when case 1 is closed, by a pair of bracket-like members 31 and 33, similar in shape to L-shaped brackets 23 and 25, but with important differences as hereinafter pointed out. Brackets 31 and 33 are of L-shaped configuration; of the same size as brackets 23 and 25, respectively, except with portions of their lock pin receiving legs broken away; stationed similarly relative to the end of crosspin 11, lock pin 19 and the wall of the lower half of case 1 as are their counterpart brackets 23 and 25 relative to their cooperating parts corresponding to the above-named parts; fastened by rivet means with one leg flush against the wall of case 1; and in all other respects, except location, the structural twins of L-shaped brackets 23 and 25, respectively. The broken away portions of the lock pin 19 embracing legs of brackets 31 and 33 comprise, in each instance, a major part of the lower half of the leg, as viewed in FIGURE 3, between its juncture with the riveted leg and a distance sufficiently far removed therefrom to leave a hook-like remnant of the leg with a semicircular hollow in its bight, into which an end of lock pin 19 fits in mating relationship. This configuration of parts is illustrated by FIGURE 3 showing the hook-like leg remnant of bracket 33 and 33a and the semi-circular hollow in its bight at 33b.

It will be apparent from the foregoing, considered in conjunction with FIGURE 3 that the hook-like leg of bracket 33 (hereinafter called bracket latch 33a), as well as its counterpart on each of the other three brackets embracive of lock pins 19 and 21, catches and holds the appropriate end of its cooperant lock pin in the mating semi-circular undercut in its bight (hereinafter called bight hollow 33b) upon closure of the case. The manner in which brackets 31 and 33 engage lock pin 19 and counterpart brackets of similar construction engage lock pin 21, when case 1 is closed, is latch-like, which accounts for the above-assigned terminology to bracket leg 33a. Consistent with this the three counterpart bracket legs to leg 3a on the lower half of case 1 will hereinafter be referred to as bracket latches.

The fully engaged position of the bracket latches and their cooperating lock pins is well illustrated in FIGURE 3, and it will now be obvious that the disassembly of the upper and lower halves of case 1 is readily accomplished by opening the case and swinging its upper half clockwise around the axis of lock pins 19 and 21 until the lower eye-loops of crosspins 11 and 13 swing downwardly and inwardly at a sufficient distance to permit disengagement of the lock pins with their bracket latches, after which there is nothing to prevent complete separation of the two halves of the case.

Proceeding now from the external particulars of case 1 to the structure of the case, itself, and the internal parts of the lunch kit, and focusing first on the lower half of the case, this is a shell-like casing of a suitable structural plastic, preferably a high temperature, thermosetting plastic, of which many varieties are well known to those skilled in the art, the forward portion 35 of which is of generally round-cornered, rectangular shape, as seen in top view, so sized as to nestingly receive a tray of frozen food 37 in built-in receptive means therefor, described in detail below. Behind forward portion 35 of the lower half 5 or case 1 there is an enclosed area 39 of relatively narrow width, the enclosing structure and purpose of which will be hereinafter described and discussed.

Fitting nestingly within half 5 of case 1, and substantially defining that part of the lower half heretofore identified as forward portion 35, is a shell 41 of a suitable insulating material. Shell 41 is disposed in mating adjacency to the forward wall 6 of the lower half of case 1 and a good part of the sides and bottom thereof, with its upper edge terminating at a level even with the bottom of the lip-like protrusion around the peripheral rim of the lower half of the case which meets with a counterpart protrusion around the rim of its upper half to form the bead-like ridge of previous reference around its middle upon closure thereof. Hereinafter, the lip-like protrusion on the lower half of the case will be referred to as lip 43, that on the upper half as lip 45 and the bead-like ridge which they meet to form as bead 47. Although insulating shell 41 is in mating interfit with the walls and bottom of the lower half of case 1 around most of its outer surface, since it does not extend all the way from front to rear therewithin its rear wall stands isolated from the rear wall of that half of the case. The upper part of the rear wall of shell 41 is, however, in tight fitting engagement with a generally angular member 49 of plastic construction which runs transversely across the lower half of case 1 with one flange directed generally horizontally rearwardly within the case and the other depending downwardly in hugging proximity to and extending part way to the bottom of the rear wall of the shell.

Angular member 49 is shouldered from both transverse directions to form two shelf-like ledges 51 and 53 of differing dimensions, the former facing forwardly, towards the front of the case, and the latter facing rearwardly. The elevation of ledge 51 is on a level with the top edge of insulating shell 41. Angular member 49 serves as a retaining barrier against the rear side of shell 41, thus helping to hold it nestingly within the lower half of case 1, as shown particularly well in FIGURE 3. Shell 41 is held in place by tight friction innerfit with its structural surroundings but, if desired, it can be more firmly secured by glue, or other, fastening means between it and the surrounding surfaces of contact therewith.

Fixedly secured around the upper edge of forward portion 35 of the lower half of the case is a continuous insulating member 55 fitting tightly within the ledge-like inner surface of lip 43 and ledge 51 of angular member 49. Insulating member 55 extends beyond the inner edge of its ledge-like seat to cover the top edge of shell 41 and thus serve as a continuous liner for the shouldered shelf construction formed by that edge and the inner surface of lip 43, as shown in FIGURE 3. Here again, as in the case of the nesting of shell 41 within its restrictive surroundings, insulating member 55 fits sufficiently tightly in its seat to stay in place but it can, if desired, be glued, or otherwise fastened, therein to assure a greater permanency of attachment.

Fitting tightly over insulating member 55 is a substantially L-shaped metal ring, one flange of which extends outwardly to fill the ledge area atop the insulating member and the other flange of which extends downwardly as a tight hugging skirt against the upper portion of the hollow formed by shell 41 and that portion of insulating member 55 resting on its top edge, all as illustrated in FIGURE 3. The described parts are so sized, configured and assembled as to form a wide peripheral rim around the upper edge of forward portion 35 of the lower half of case 1, the rim surface constituting the upturned parts of lip 43 and insulating member 45 and the L-shaped metal ring 57 where the latter member is adjacent the walls of the lower half of the case, and the upturned edge of angular member 49 separating ledge 51 and 53, the upturned edge of insulating member 55 and the upturned flange surface of L-shaped metal ring 57 at the rear of said forward portion 35.

The same situation obtains relative to the fastening of L-shaped metal ring 57 in place (friction fit with optional glue, or other, fastening means for firmer attachment) as obtained in the case of insulating shell 41 and insulating member 55. L-shaped ring 57 has an internally projecting flange 59 downwardly offset from its upturned forward portion 35 rim surface, the position and width of the flange being such as to form a shouldered shelf designed to receive the outturned rim of a metal pan 61, described in greater detail below, and the overlying outturned rim of food tray 37, of above reference, whereby the upper surface of the food tray is maintained substantially flush with the upper level of the space within forward portion 35 of the lower half of case 1. The described arrangement of parts, including food tray 37, is shown in FIGURE 3.

It will be apparent from the FIGURE 3 illustration, and the foregoing partial description thereof, that metal pan 61, and each of the parts which cooperate to support it around its outturned rim, is designed to provide a receptive nest for a food tray of such size as to fit matingly thereinto in the above-described manner. This poses no particular problem, since a great variety of foods are commercially available in food trays of a common peripheral size. Thus the lunch kit can be tailored to this particular size of tray, thereby assuring an adequate variety of hot lunches to its owners.

Pan 61 is dimensioned to receive the food tray in bottom resting support therein but its walls are steeper than those of the tray to provide warm air circulating space therebetween for better evenness of heat distribution in the immediate tray wall vicinity. The circumferential wall of pan 61 is apertured near its bottom portion, as illustrated at a and b on FIGURE 3, to permit the inflow of heated air from its outer surroundings into the space occupied by food tray 37, the inflowing hot air going into the above-mentioned space between the pan and food tray walls and thereafter flowing throughout the spaces under the tray between its food containing compartments, as shown at c on FIGURE 3 and underlying the ridges between the food compartments as illustrated on FIGURE 2 in partly dotted and partly solid outline. From the spaces under the food tray and between its food compartments, the hot air exits through openings in the tray such as those shown at d and e on FIGURE 2, to subsequent outflow from the lunch kit along flow paths and through openings hereinafter described.

Disposed near the bottom of insulating shell 41, and centrally positioned therewithin, is an electrical heating element 63, of a high resistance metal, suspended between the bottom of shell 41 and a metallic heat shield 65. The heating element is suspended by means of a plurality of strategically located brackets comprising sections of strap metal depending downwardly from straight sections spot welded to the undersurface of heat shield 65, to form therebelow curved hangers of such dimension as to snugly receive the heating element and thus hold it in suspension above the bottom of the shell 41. Two of the brackets are illustrated at 67 and 69 on FIGURE 3. As that figure illustrates, the curved portions of the brackets are tangentially supported by the floor of shelf 61.

Each of the peripheral edges of heat shield 65 extends outwardly from the outer periphery of heating element 63 a substantial distance, as FIGURE 3 shows, to provide an extensive heat radiating surface and eliminate, or sharply minimize, the formation of hot spots above the heating element. The shield is held in its proper position within insulating shell 41 by a plurality of angle brackets, each having an upstanding leg welded to metal ring 57 and a horizontally disposed leg welded to the top surface of the shield, one such bracket being shown at 71 on FIGURE 3. The brackets are so angled as to provide a flush fit at each end against the surfaces to which they are attached and all but one are shaped similarly to angle 71, the one exception being shown at 73, on FIGURE 3, and differing slightly therefrom as hereinafter noted.

The above-described assembly of parts fill that portion of the lower half of case 1 hereinabove designated as forward portion 35 thereof, and, as will now be clear, this comprises the food containing chamber of the lunch kit in which the frozen food is thawed and heated to proper temperature for eating. The manner in which all of the described parts fit together should be clear, with the possible exception of the tie-in structure between the ends of angular member 49 and the side walls of the lower half of case 1. That structure will, however, be evident from FIGURE 2 which shows that the ends of angular member 49 thicken and curve forwardly to meet the sides of the lower half of the case and provide an uninterrupted shelf curve for the seating of insulating member 55 in the transition area therebetween. Angular member 49 is fixedly secured at each end to its respectively meeting side walls of the lower half of case 1 by glue fastening means.

The electric current for the heating element is obtained from any 110 volt R.C., or equivalent, source, which is switched on when necessary by timer means discussed below, conducted into and away from the element by means of two wires 77 and 79 attached to its ends, of which only the former is visible in the FIGURE 3 sectional view. Wire lead 77, as does 79, enters shell 41 through an appropriately sized and positioned aperture in its rear wall, wherein it is solder connected to the terminal of a contact point 81 suspended from angle bracket 73 by means of a smaller angle bracket 83 sized and positioned as shown in FIGURE 3. Lead wire 77 is covered with insulation to a point within shell 41 just short of its terminal connection with contact point 81, and an insulating washer 85 is sandwiched between the two legs of angle bracket 73 and 83 where they are fastened together for support of the latter.

Spaced in point-gap proximity to contact point 81 is a second contact point 87 aligned therewith and supported by an angle bracket 75. Angle bracket 75 has a horizontal leg fastened flush against the undersurface of heat shield 65 by fastening means which also ties the heat shield to angle bracket 73. A second insulating washer 89 is sandwiched between the heat shield and the latter bracket. Connected to the terminal of contact point 87 is one end of a lead wire 91 running from it to connection at its other end with heating element 63, as shown in the FIGURE 6 diagram of the circuit. The butt end of a bimetallic thermostat 93 is fastened to contact point 87 in such a way that expansion of its metallic coil, which is directed inwardly from the section plane of FIGURE 3, causes the point to move into and out of contact with point 81.

While the particulars of the thermostat support means and the means permitting contact point 87 to move back and forth through the point gap distance between it and point 81 are not illustrated or explained in detail herein, this is unnecessary since thermostat systems of the present sort are well known and the installation of such a system in the described circuit would not unduly tax the ordinary abilities of one skilled in the art. Since the recommended thawing and heating temperature for packaged frozen foods is normally about 450° F., or not far removed therefrom, thermostat 93 is preferably set for operation at that temperature plus or minus about 5° F.

The rear part of the lower half of case 1, behind forward portion 35, is enclosed at the top by a plastic cover 95, the front edge of which fits snugly on and is supported by shouldered ledge 53 of angular member 49, and the side and rear edges of which abut the inner surface of the lower half of case 1 just below its rim. The thickness of plastic cover 95, the height of the strip of exposed surface of angular member 49, and the fit of the side and rear edges of the cover against the side and rear walls of the lower half of case 1, are all such as to assure a level surface from the outer edge of each member abutting an edge of cover 95 to any other outer edge around the periphery of the area thereby encircled.

From the drawing illustrations, and the foregoing description of the lower half of case 1, it will be evident that the area to the rear of forward portion 35 of the lower half of case 1 is an enclosed space surrounded by portions of the bottom and side walls and the rear wall of the lower half of case 1; plastic cover 95; angular member 49 and, below the latter, a part of the rear wall of insulating shell 41. Hereinafter, for the sake of simplicity, this space will be referred to as lower rear space 97. Lower rear space 97 is unoccupied except for the submerged (below plastic cover 95) portion of a timer 99, a dial and pointer portion of which is above the cover; and most of the length of the two wire leads 77 and 79 connecting heating element 63 to its source of power. Timer 99 is of the conventional sort, with timing mechanism so interlinked with contact points in the electrical circuit as to move the separated points into contact after the lapse of a predetermined period of time after the timer mechanism is set for activation consistently therewith.

The support structure and wiring details of the timer assembly are not shown in the drawings, but these particulars are so commonly known as to require no present teaching thereof to enable one skilled in the art to install and use such an assembly in the lunch kit of this invention. Hence, the luxury of further discussion of the timer will be dispensed with. Lead wires 77 and 79 are connected, at their upper ends, to the terminals of two contact points, 101 and 103, respectively, which rest on the upper surface of plastic cover 95 but have their terminals projecting through properly sized and located holes in cover 95 to make the indicated connections.

Contact points 101 and 103 are matched by complementary contact points supported in the upper half of case 1, in a manner hereinafter described, and so located as to make contact, respectively, therewith, and thus close the circuit at that point, upon closure of the case by bringing its two halves together in the manner illustrated by FIGURE 3. For the same reason that only wire conductor 77 is shown in lower rear space 97, only one wire is shown in the space within upper half 3 of case 1 as it appears in FIGURE 3. By the same token, only one of the aforesaid complementary contact points is shown in that part of the upper half of case 1 visible in FIGURE 3, this appearing at 107 in contact with point 101. Contact point 107 is supported by means of one of the angle brackets referred to previously and shown at 109, and the bracket is in turn, supported against the rear wall of the upper half 3 of case 1 by having an upstanding leg secured thereto by glue means.

Plastic cover 95 is fixedly secured in its described position over lower rear space 97, by glue means, to maintain it in its proper place at all times. Contact point 101 is friction fitted in its receptive hole in plastic cover 95, but it can, of course, be glued, or otherwise fixedly secured, in place for added durability if desired. While only one contact point and its angle bracket support means is shown in the space directly over lower rear space 97, in FIGURE 3, the other contact point in that space has a counterpart bracket support means similar in everything but position to angle bracket 109. The two upper contact points are situated relatively close together, as they must be to match the two lower contact points which are spaced as shown in FIGURE 2.

Turning now to consideration of the upper half of case 1, it is first pointed out that, while the outer appearance of that half of the case somewhat resembles the appearance of its lower half, internally the two halves are in marked structural contrast. Thus, a large part of the space within the upper part of the case is occupied by a compartmented enclosure 111 situated generally above forward portion 35 of the lower half of the case when it is in the closed position. Compartmented enclosure 111 has a bottom portion 113 and integral walls 115 which are in turn integral with the top, or outer, portion of upper half 3 of case 1. An integral partition 117 divides enclosure 111 into a major forwardly disposed area 111a and a rearwardly disposed smaller area 111b which is in turn sub-divided into smaller compartments by a transverse integral partition 111c, located as shown in FIGURE 1. Forward part 111a of enclosure 111 is suitable for the storage of larger food items such as, for example, the slices of bread shown at 119 in the drawings. The smaller, sub-divided areas within rearward space 111b are suitable for the carrying of such small items as shakers of salt and pepper, as shown at 121, or the like. Eating implements can be carried in forward part 111a of enclosure 111 in the manner shown in FIGURE 1, where such implements are illustrated at 123.

Compartmented enclosure 111 has a hinged lid cover 125, fastened in place at its forward end by a transversely central locking screw 127 with an enlarged knob 127a by means of which it can be tightened or loosened by hand to lock the cover in place or unlock it for access to the contents of the enclosure. The front edge of lid cover 125 fits snugly into a recessed ledge 131 running along the front edge of the opening covered thereby. Locking screw 127 turns in a mating tap hole in a molded projection 129 extending inwardly from, and with its upper surface coplanar with, recessed ledge 131 a sufficient distance to provide solid anchoring of the front end of lid cover 125 by means of said screw. As previously indicated, lid cover 125 is hinged, this being accomplished by means of two pivotal connections between lid cover 125 and the side walls of compartmented enclosure 111, one such connection being disposed at each rear corner of the lid cover. One of these pivotal connections is shown at 133 on FIGURE 3. Enlarged knob 127a of locking screw 127 is knurled, as shown in the drawings, for easy hand manipulation thereof.

Depending downwardly from the lower rear edge of compartmented enclosure 111, and integral therewith, is a shouldered skirt 111d, relatively thick in its upper portion but thinned in its lower portion to terminate in a flat rim, so sized and positioned as to meet flush with the upturned rim of generally angular member 49 in the lower half of case 1 when the two halves of the case come together to form the enclosed lunch kit. The downturned rim of skirt 111d curves at its outer ends and merges into the walls of the upper half of case 1 to conform in shape to and meet throughout its length the upturned rim of angular member 49. Likewise, the whole of depending ridge 111d curves and melts into the side walls of the upper half of case 1 at each end, the size, configuration and positioning of the shouldered portion of the skirt being such as to assure a smooth transition therefrom into the internal contours of lip 45 around the periphery of the upper half of the case. This provides a seat around the lower periphery of an area in the upper half 3 of case 1, roughly equivalent to the opening area of forward portion 35 of the lower half of the case, for an insulating ring-like member of angular cross-section 135.

Insulating member 135 is, as its name implies, fabricated from a suitable heat insulating material and it terminates at its lower periphery in a flat rim of such size and shape as to meet the upturned rim of insulating member 55 in the lower half of the case around its periphery when the two halves of the case are fastened together as shown in FIGURE 3. At its upper end, insulating member 135 terminates in a relatively wide flat rim, horizontally disposed to abut flush against the outer periphery of the under side of an insulating plate 137 disposed immediately thereabove as shown in FIGURE 3. Insulating plate 137 is so sized, shaped and peripherally configured as to fit snugly around its circumference against the side and front walls of the upper half of case 1 and, at its rear, tightly into a corner 111e formed by the bottom surface of compartmented enclosure 111 and the downwardly depending thick portion of skirt 111d, as shown on FIGURE 3.

Pressed tightly into the seat formed around its peripheral edges by the downwardly facing internal contours of ring-like member 135, and elsewhere by the bottom surface of insulating plate 137, is a metallic lid 139. Insulating plate 137 is sandwiched tightly between the underside of compartmented enclosure 111 and the upper surface of metallic lid 139, as well as the upwardly facing rim of ring-like member 135 where it encircles the lid in the manner illustrated by FIGURE 3. By virtue of this tight sandwich fit, and a snug peripheral abutment of insulating plate 137 against its surrounding vertical, or substantially so, surfaces of enclosure, plate 137 serves to seal off the area situated thereabove within case 1 from heat and gases generated in the lower half of the case while it is performing its food thawing and heating function in the manner described hereinafter.

Downwardly depending from the periphery of the bottom, or inner, surface of metallic lid 139 is a hollow bumper 141 having a flat segment which is affixed to the flat bottom of the lid and a downwardly extending tubular segment integral with the flat segment, the latter being so sized and configured as to make contact with the peripheral rim around the upper edge of food tray 37 when the lunch kit is loaded and closed. Bumper 141 is of a high resistant thermosetting plastic material and sufficiently resilient to grip the outer edge of the food tray to prevent its slippage when the lunch kit is in the carrying position shown in FIGURE 1.

Fitted tightly within the space between the front wall of the upper half of case 1 and the generally parallel front wall of compartmented enclosure 111, shown at 115a on FIGURE 3, is an insulating strip 143, made of a suitable insulating material and in sealing contact, around its peripheral edges, with adjacent structural portions of the lunch kit to prevent the escape of gas into the space within the lunch kit thereabove. Here again, as in the case of the various internal parts of the lower half of case 1, the described parts of the upper half of the case which fit together snugly can be, where necessary or desirable, fastened together at their meeting surfaces by glue means, or the like, to enhance the durability and tightness of construction of the lunch kit.

To the rear of the interior of the upper half of case 1 there is a space surrounded on all but one side by portions of the walls and top of the upper half of the case and the rear wall of compartmented enclosure 111, shown at 115b on FIGURE 3, including downwardly depending shouldered skirt 111d which is in reality an extension thereof. This space, which will hereinafter be referred to as upper rear space 145, is disposed generally above the lower rear space 39 in the bottom half of case 1. Upper rear space 145 is substantially unoccupied except for that part of timer 99 disposed above the cover 95 for lower rear space 39, and the two lead wires and their contact point hardware, including the contact point brackets, previously referred to which connect lead wires 77 and 79 in the lower half of the lunch kit with an outside source of electric power when the kit is in its closed portion.

As previously indicated, only one of the two wires within upper rear space 145 is shown in FIGURE 3. This is all the showing necessary, however, to teach the wiring arrangement within the lunch kit since the omitted wire is, as previously explained, substantially identical to the one shown previously identified as wire 105 so far as its contact point hardware and manner of exit from the lunch kit are concerned. Consequently the following discussion will be in terms of specific reference to wire 105, but it can be construed as definitive of the other wire as well, the only difference between the wires being that the "other wire" is spaced slightly apart from wire 105 within upper rear space 145. Concentrating now on wire 105, it will be seen from the drawings that it stretches from juncture with its contact point 107 to rear wall 115b of compartmented enclosure 111. Wire 105 then passes through an insulator 147 tightly fitted in a mating opening in rear wall 115b, after which it is wrapped, along with the other wire, not shown, emerging from upper rear space 145, to form an insulated cord 149, of conventional type, which is brought out of the lunch kit through a small notch opening in one side, and near the rear, of hinged cover 125, as shown in FIGURE 1. The outer end of cord 149 has a plug connector 151, of conventional type, for use in an ordinary 110 volt A.C. electrical outlet.

The lunch kit is vented to its outer surroundings by means of aligned openings in metallic lid 139 and insulating plate 137, one pair of such openings being shown at 139a and 137a, respectively, on FIGURE 3, and cooperating openings in the front wall of upper half 3 of case 1, an example of one such opening being shown at 3a on FIGURE 3. As the directional arrows on FIGURE 3 indicate hot air produced in the lower half of the lunch kit during food thawing and heating operations taking place therein when the kit is in use, flows upwardly toward vent opening 139a and from thence through opening 137a and eventually through front opening 3a in the upper half of the case. Access from opening 137a to front opening 3a of the lunch kit is made possible by the provision of space between insulating strip 143 and insulating place 137. While this space has not previously been mentioned, the manner in which it is achieved is readily apparent from FIGURE 3 which shows that the insulating strip is angled upwardly from its rear edge of contact with the upper surface of insulating plate 137 to a meeting contact of its front edge with the front wall of the uper half of case 1 sufficiently high above plate 137 to form a gap therebetween of substantially the same width as the aforesaid opening 3a.

The lunch kit is employed by first loading it with a food tray, such as tray 37, closing it to the FIGURE 3 position and fastening clasp 7, and plugging it into a convenient electrical outlet. Timer 99 is, or has previously been, adjusted to turn the heating element on early enough to thaw and heat the food in tray 37 to proper eating temperature in time to permit its consumption during the noon, or equivalent, lunch hour. As previously indicated, timer 99 is of a conventional type known to those skilled in the art, and, consequently, neither its structural details nor its method of operation will be here discussed. The heating element, when turned on, heats the air within the space below metal pan 61 to the proper temperature, normally about 450° F., and is thereafter controlled to maintain the air at that temperature by means of a bimetallic thermostat 93. Heat shield 65 catches some of the heat from the heating element and transmits it to food tray 37 but it also decentralizes the heat, thus eliminating hot spots and permitting heat distribution in fairly even concentration around the sides, as well as the bottom, of the tray. Hot air enters pan 61 through the openings in its peripheral walls, as exemplified by openings a and b of FIGURE 3, and bathes the outer surfaces of tray 37 in the manner previously described. The heat gradually permeates the contents of tray 37, thus thawing the food and then raising it to the proper temperature for eating purposes.

Tray 37 differs from conventional frozen food containers in that it has one or more openings, such as shown at 37a and 37b on FIGURE 2, and at 153 in FIGURE 5 (the latter figure showing an alternative tray design of this invention), in its web portions constituting the flat upper surfaces of partitions dividing the tray into its separate food compartments. A metal foil covering for a tray so apertured has matching openings, the peripheral edges of which are tucked around the edges of the tray opening, or openings, and crimped thereunder in the same way it is crimped around the outer rim of the tray. The purpose of the opening, or openings, is to permit upward flow of the hot air from the spaces within metal pan 61 around tray 37 into the space directly above the tray and underneath metallic lid 139, from whence it flows to the outer environment through openings 139a and 137a in lid 139 and insulating plate 137, respectively, and front opening 3a in the lunch kit (and counterpart openings in the affected parts), in the abovedescribed manner and in accordance with the directions indicated by the arrows on FIGURE 3. This flow of air through pan 61 to the outer environment of the lunch kit aids in the heating of food tray 37.

A signaling device of some sort, such as a signal light, can be incorporated in the lunch kit circuit to signal the final readiness of the food in tray 37 for eating, if desired. However, in the absence of such a device, the lunch kit owner will known when the food is ready because of his awareness of the heating time programmed into the food warming preparation by the setting of timer 99.

An additional aspect of the present invention, not heretofore discussed, involves the use of a special type of metal foil cover for the food tray. The cover differs from conventional ones in that it has a tear line, as shown at 155 on FIGURE 4, circling the foil slightly inboard of the inner edge of the tray flange, by means of which that portion of the cover directly over the food of the tray can be torn away to expose the food for eating. Alternatively, the tear line can be made to encircle separate food compartments so that they can be exposed individually, if desired, to satisfy the particular eating habits of the lunch kit owner. The tear line can be a scored, perforated, or equivalent line in the metal foil so weakening it as to permit easy puncture at any point along the line and subsequent removal of the entire cover by simply tearing it along said line. The principal advantage of the tear lines is, of course, to permit removal of the tray cover without having to handle the hot tray itself. Thus, the foil cover can be easily removed from the tray while it remains seated within the bottom half of the lunch kit and the food can be eaten directly from the tray in that position.

It is, of course, possible to remove a metal foil cover of conventional type, that is, one without a tear line, from a hot food tray without taking the tray from the bottom half of my lunch kit, but the presence of a tear line in the cover simplifies the procedure. While the hot tray can be removed from the lunch kit before opening it, it is preferable to avoid the handling of such a tray by leaving it in the kit during the cover removal process, and then heating the food directly from the tray in place therein. Although it will be obvious from the above discussion of metal foil tear lines, it is nevertheless pointed out that where food trays with openings in their web portions for hot air circulation purposes are employed in conjunction with my lunch kit, suitable tear lines around the tray openings can be provided in the tray coverings to permit easy tearing of said coverings therearound.

After a tray of food has been heated in the lunch kit and is ready for eating, the kit is opened and the top half separated from the bottom half in the previously described manner. Both the thawing and eating of the food and the disassembly of the kit thereafter should be done with the bottom half of said kit in the horizontal position, as illustrated by FIGURE 3, to avoid displacement of the thawed food in the food tray. Likewise, where the food is eaten directly from the food tray in position in the lunch kit to avoid handling of the hot tray, the kit should obviously remain in the FIGURE 3 position for best results.

The particularly illustrated embodiment of this invention has been described in considerable detail in order to comply with applicable patent law requirements. It will be appreciated, however, that there are numerous possible embodiments of the invention differing in non-critical details therefrom, and that all such fall within the scope of my invention. Thus, the lunch kit can be vented to the atmosphere through the wall of the lower half of its case, rather than the upper half as shown in the drawings. This structural variation permits use of the lunch kit in conjunction with conventional frozen food trays without openings of the above-described type in their web portions.

In another variation of the illustrated embodiment of my invention, a miniature gas heater can be substituted for the electrical heating unit shown and described herein. A suitable gas heating unit can be made of such conventional parts as a supply tube or fuel cell of gaseous fuel, a master cam, a motor to drive a fan to supply air to the gas flame, batteries for the motor, a timer, a flint, a flint igniter to start the pilot burner, and a main burner which is ignited from the pilot burner. The various parts of the gas heating unit can be easily assembled and installed in, or accessory to, a housing such as case 1 by those skilled in the art with little difficulty, in the light of present teachings. Any other equivalent heating system can likewise be employed for purposes of this invention, if desired. By the same token, equivalent functional substitutes can be used in lieu of any of the herein illustrated or described parts of my lunch kit.

The preferred material of construction for case 1 is a high temperature thermosetting plastic. However, any other suitable material, of which there are many, can be substituted therefor if desired. In like manner, equivalent materials of construction can be employed in lieu of any of the materials specifically mentioned above for the various parts of the lunch kit. The same thing, relative to the substitution of equivalent parts or materials of construction, holds true for my novel food tray as for the lunch kit of this invention. Thus, for example, the metal foil covering for the tray can have a tear line superimposed over its peripheral flange, or even coincident with either edge of the flange, rather than inboard of said flange, if desired.

In summary, while my invention has, as indicated, been described in considerable detail, this is not intended in any way to limit the broad features or principles of the invention or the scope of patent monopoly sought, except insofar as necessitated by the breadth of the following claims.

What is claimed is:

1. Lunch kit means adapted to receive, hold, thaw, and heat a tray-like container of frozen food, comprising, in combination:
   (a) case means having an upper and a lower part which fit together to form an enclosure;
   (b) fastening means accessory to said case means adapted to permit locking together and unlocking of its upper and lower parts;
   (c) receptive means within the lower part of said case means so constructed as to receive and hold a tray-like container of frozen food upright when positioned consistently with the food thawing and heating position of the lunch kit;
   (d) heating means disposed within said lower part of said case means and underneath the aforesaid receptive means therewith;
   (e) temperature control means disposed within the lower part of said case means;
   (f) means for energizing said heating means, whereby the heating means can serve to thaw and heat frozen food disposed in said receptive means;
   (g) support and positioning means for the aforesaid heating and temperature control means and the means for energizing said heating means securing them in proper functional and positional relationship on and within said lunch kit means;
   (h) heat insulating means disposed in surrounding relationship to a space within said case means, when its upper and lower parts are fastened together, encompassing the heat generating portion of said heating means and the aforesaid receptive means for the tray-like container of frozen food;
   (i) means securing said heat insulating means in functional position within said case means;
   (j) holding means adapted to hold said tray-like container of frozen food within said receptive means when said upper and lower parts of said case means are locked together; and
   (k) means securing said holding means, in proper functioning position, to said lunch kit means;
   (l) the various parts of the lunch kit means cooperating to thaw and heat a tray-like container of frozen food when said container is placed in said receptive means within the lower part of said case means, the two parts of said case means are fastened together, and said heating means are energized for a sufficient period of time to accomplish the intended purpose.

2. The lunch kit means of claim 1 in which said heating means is an electrical resistance heating element.

3. The lunch kit means of claim 1 in which said temperature control means is a bi-metallic thermostat.

4. The lunch kit means of claim 1 in which the means for energizing said heating means comprises a timer and cooperating electric circuit means adapted to energize the heating means at a preselected time, and thereafter continue it in operation for a predetermined time period, when properly set and connected to a source of electric current.

5. Lunch kit means adapted to receive, hold, thaw, and heat a tray-like container of frozen food, comprising, in combination:
   (a) case means having an upper and a lower part which fit together to form an enclosure;
   (b) fastening means accessory to said case means adapted to permit locking together and unlocking of its upper and lower parts;
   (c) receptive means within the lower part of said case means so constructed as to receive and hold a tray-like container of frozen food upright when positioned consistently with the food thawing and heating position of the lunch kit;
   (d) heating means disposed within said lower part of said case means and underneath the aforesaid receptive means therewithin;
   (e) temperature control means disposed within the lower part of said case means;
   (f) means for energizing said heating means, whereby the heating means then serves to thaw and heat frozen foods disposed in said receptive means;
   (g) signal means adapted to signal the termination of the proper thawing and heating period during operation of said lunch kit means, thereby giving notice that the food is ready for eating;
   (h) support and positioning means for the aforesaid heating, temperature control and signal means and the means for energizing said heating means, securing them in proper functional and positional relationship within said lunch kit means;
   (i) heat insulating means disposed in surrounding relationship to a space within said case means, when its upper and lower parts are fastened together, encompassing the heat generating portions of said heating means and the aforesaid receptive means for the tray-like container or frozen food;
   (j) means securing said heat insulating means in functional position within said case means;
   (k) holding means adapted to hold said tray-like container of frozen food within said receptive means when said upper and lower parts of said case means are locked together; and
   (l) means securing said holding means, in proper functioning position, to said lunch kit means;
   (m) the various parts of the lunch kit means cooperating to thaw and heat a tray-like container of frozen food when said container is placed in said receptive means within the lower part of said case means, the two parts of said case means are fastened together, and said heating means are energized for a fastened together of time to accomplish the intended purpose.

6. The lunch kit means of claim 1 in which said fastening means are so characterized as to permit the locking together, unlocking and complete disassembly of the upper and lower parts of said case means.

References Cited

UNITED STATES PATENTS

| | | | |
|---|---|---|---|
| 2,490,076 | 12/1949 | Maxson | 219—400 X |
| 2,545,127 | 3/1951 | Wnuk | 219—387 |
| 2,993,431 | 7/1961 | Weishaus. | |
| 3,154,668 | 10/1964 | Swartz | 219—387 |

RICHARD M. WOOD, *Primary Examiner.*

R. F. STAUBLY, *Assistant Examiner.*